United States Patent Office 3,067,223
Patented Dec. 4, 1962

3,067,223
ORGANOMETALLIC DERIVATIVES OF ACID CLAYS
Walter H. Peterson, Point Richmond, Calif., and Peter K. Freeman, State College, Pa., assignors to Shell Oil Company, a corporation of Delaware
No Drawing. Filed July 28, 1959, Ser. No. 829,969
12 Claims. (Cl. 260—429)

This invention relates to the provision of a new class of metal-containing salts which are useful for a wide variety of valuable purposes. More particularly, this invention relates to a new class of organometallo salts which are useful for such diverse purposes as: superior gelling and/or thickening agents for greases; additives for improving the detergency and surface properties of lubricating oils; additives for improving the extreme pressure properties of lubricating oils and greases; anticorrosion additives for lubricating oils and greases; catalysts for a variety of different chemical reactions; bodying and/or stabilizing agents for inks, drilling muds, and the like.

In the production of bodied lubricants, it is customary to prepare solutions or dispersions of soaps in lubricating oils, the function of the soaps being to body up the oils to grease consistency. Soaps commonly used for this purpose are the metal salts of long carbon chain saturated and unsaturated fatty acids, as for example, sodium stearate, magnesium stearate, aluminum palmitate, etc., although salts of carbocyclic acids, such as lead naphthenate, are also useful. It is commonly observed that lubricants consisting of these soap-in-oil dispersions have a relatively high thermal coefficient of viscosity and that at temperatures often encountered in machinery under normal operating conditions these greases become fluid, resulting in loss of the lubricant and damage to the machinery. This is to a considerable extent a function of the melting point of the soap. Thus, the magnesium, zinc and aluminum soaps are not suitable for high temperature applications because of their low melting points.

It is known that a clay mineral such as montmorillonite, originally exhibiting a substantial base-exchange capacity, can be reacted with an organic compound such as an organic ammonium compound to replace the clay cation by an organo ammonium cation to form a water-repellent product which is called "onium clay."

Certain of the "onium clays" will gel mineral lubricants to greases and they do not have any melting point like the soap gelled greases. But they have limited thermal stability which may be due in part to the tendency of the "onium clay" to be oxidized at high temperatures.

Another important aspect of lubrication comprises the ability of lubricants to withstand alteration in physical properties in the presence of ionizing radiation, such as in nuclear reactors and the like. Most lubricants and gelling agents fail under such conditions. For example, the soap base greases usually liquefy, while greases containing silicon oils normally first liquefy, then resinify and solidify in the presence of radiation. The onium clays are generally prepared from aliphatic onium compounds, and thus are subject to deterioration in the presence of ionizing radiation.

We now have discovered a new class of gelling and/or thickening agents which is not subject, or is markedly much less subject, to the foregoing disadvantages. This new class of materials is characterized as a salt of a base-exchange clay—that is, clay in which exchangeable inorganic cations have been replaced in substantial part by a cation containing one of certain transition metals bonded to each of two polyunsaturated carbocyclic nuclei—i.e., an organometallo cation containing the structural moiety: $(A-M-B)^{+b}$, wherein M is the metal, A and B each represents a polyunsaturated carbocyclic nuclei, and $b$ is a positive charge varying from 1 to 3. The character of this cation will be described in more detail hereinafter.

We have found that greases containing the new gelling agents have good consistency at low temperatures, and have extremely high dropping points; that these greases have low thermal coefficients of viscosity and that they have exceptionally high thermal stability and oxidation stability, as well as high resistance to alteration in the presence of ionizing radiation. The bodied lubricant may be grease-like in nature or may be a relatively liquid lubricant in which the organometallo salt of the clay performs the function of a thickener therefor, thus modifying the viscosity of the oil and its viscosity-temperature characteristics. One of the features of our discovery is that it is unnecessary for the organometallo clay salts to be swellable in organic media although some of the species may exhibit swelling properties. These organometallo clay salts are highly efficient grease-forming agents whether or not they swell in the lubricating oil or in other organic solvents. It is preferred, however, that relatively large organic radicals be attached to the transition metal since this enables a "direct transfer" step to be utilized in the manufacture of lubricants, as described more fully hereinafter.

It is thus evident that we have discovered a new and valuable kind of salt—characterized by the presence of the class of organometallo cation characterized by the structural moiety consisting of one of certain of the transition metals bonded directly to the ring of each of two polyunsaturated carbocyclic nuclei, that moiety bearing a positive charge because of the metal being in an oxidation state of at least one. As has been set out hereinbefore the necessary structural moiety is characterized by the formula: $(A-M-B)^{+b}$, wherein M represents the metal, A and B each represent one of the carbocyclic nuclei, and $b$ is $+1$, $+2$ or $+3$. The suitable transition metals —"M"— are the metals of groups IVB, VB, VIB, VIIB and VIII of the periodic chart of the elements, The Merck Index, 6th edition, 1952 (inside front cover), but not including managanese. Managanese, for reasons which are not entirely clear, does not form suitable cations. The suitable transition metals thus are: titanium, vanadium, chromium, iron, cobalt, nickel, zirconium, niobium, molybdenum, technetium, ruthenium, rhodium, palladium, hafnium, tantalum, tungsten, rhenium, osmium, iridium and platinum. Those of our new salts wherein the metal is iron, cobalt or nickel, and particularly iron, are preferred because of their very high level of stability.

The polyunsaturated, carbocyclic nuclei represented by the symbols "A" and "B" may be the same, or may they be different, and are either aromatic in character or are cyclomatic in character, and are bonded directly by one or more carbon atoms of the ring thereof of the metal, M. By a cyclomatic nucleus is meant a carbocyclic ring having the cyclopentadienyl-type structure. The salts of the invention wherein both of the carbocyclic nuclei are cyclomatic are preferred.

The nature of the cyclomatic nucleus, within the intent and meaning contemplated in this invention, is set out in detail in the Brown et al. patents, U.S. 2,818,416 and U.S. 2,818,417. The cyclomatic and/or aromatic nuclei may be unsubstituted, or they may be substituted, as may be desirable. The preferred cyclomatic nuclei are those of the first class set out in U.S. Patent 2,818,416—that is: the cyclopentadienyl radical and substituted cyclopentadienyl radicals. The preferred substituted cyclopentadienyl radicals are those wherein the substituent group or groups is or are hydrocarbon, particularly alkyl groups, containing up to 20 carbon atoms each. The suitable alkyl groups may be of straight-chain, or of branched-chain configuration.

The suitable cation may be the organo-metallic structural moiety $(A-M-B)^{+b}$ per se, or it may be the cation containing that structural moiety but wherein one or more electron donating group satisfies one or more of valence bonds of the metal. These latter cations are characterized by the formula: $[(A-M-B)(X)_m]^{+c}$, wherein A, M and B have the respective meanings set out hereinbefore, X is the electron donating group, $c$ is at least one, and $m$ is at least one, with the proviso that the sum of $m+c$ does not exceed 5. The suitable electron donating groups are those donating one or two electrons set out in U.S. Patent 2,818,416. It will be evident from the foregoing that only metals which can exist in an oxidation state of 2, 3, 4, or 5 can form these latter cations.

Typical of the cations wherein the cation is the organo-metallic moiety per se are (R being the cyclopentadienyl group): $(R-Ti-R)^{+1}$, $(R-Ti-R)^{+2}$, $(R-V-R)^{+1}$, $(R-V-R)^{+2}$, $(R-Cr-R)^{+1}$, $(R-Fe-R)^{+1}$ (i.e., ferricinium ion where R is the cyclopentadienyl moiety), $(R-Co-R)^{+1}$ (i.e., cobalticinium ion where R is the cyclopentadienyl moiety), $(R-Ni-R)^{+1}$ (i.e., nickelocinium ion where R is the cyclopentadienyl moiety), $(R-Zr-R)^{+2}$, $(R-Nb-R)^{+3}$, $(R-Ru-R)^{+1}$
$(R-Rh-R)^{+1}$, $(R-Ta-R)^{+3}$, $(R-Ir-R)^{+1}$ and like cations, and also the cations resulting from oxidation of the following compounds:

bis(acetylcyclopentadienyl)iron,
bis(beta-chloropropionylcyclopentadienyl)iron,
bis(acryloylcyclopentadienyl)iron,
bis(ethylcyclopentadienyl)iron,
bis(dimethylcyclopentadienyl)iron,
bis(n-propylcyclopentadienyl)iron,
bis(octylcyclopentadienyl)iron,
bis(octadecylcyclopentadienyl)iron,
bis(dodecylcyclopentadienyl)iron,
bis(dihexylcyclopentadienyl)iron,
bis(didodecylcyclopentadienyl)iron,
(octylcyclopentadienyl)(dioctadecylcyclopentadienyl)iron,
(cyclopentadienyl)(di-n-propylcyclopentadienyl)iron,
bis(4,5,6,7-tetrahydroindenyl)iron,
bis(1,3,4-tripropylcyclopentadienyl)iron,
bis(butylcyclopentadienyl)nickel,
bis(isopentylcyclopentadienyl)nickel,
bis(tert-butylcyclopentadienyl)iron,
bis(di(tert-butyl)cyclopentadienyl)iron,
bis(indenyl)nickel,
bis(tetrahydroindenyl)nickel,
bis(2-ethyl-3-phenyl-4,5,6,7tetrahydroindenyl)nickel,
bis(n-heptylcyclopentadienyl)nickel,
(n-hexylcyclopentadienyl)(isopropylcyclopentadienyl)nickel,
bis(dioctylcyclopentadienyl)ruthenium,
bis(ethylcyclopentadienyl)cobalt,
bis(indenyl)cobalt, and the like.

Typical of the cations containing electron donating group include: $(R-Ti-R)(OH)^{+1}$, $(R-Mo-R)(Cl)_2^{+1}$ $(R-Mo-R)(Cl)^{+1}$, $(R-Ta-R)(Cl)_2^{+1}$, and the like.

While the cations containing two cyclomatic moieties are preferred, cations containing one cyclomatic moiety and one aromatic moiety, and cations containing two aromatic moieties also are suitable. The aromatic moiety or moieties may be mononuclear, or they may be polynuclear, examples of suitable aromatic nuclei being the benzene, naphthalene, anthracene, acenaphthene, phenanthrene, chrysene, toluene, xylene, cumene, pyrene, mesitylene, ethylbenzene, and like groups. Cations obtained by the oxidation of such compounds as bis(biphenyl)chromium, bis(benzene)chromium, (biphenyl)benzenechromium and bis(benzene)cobalt also are typical examples.

The preferred aromatic nuclei are the unsubstituted aromatic groups (benzene being most preferred) and the hydrocarbon-substituted aromatic groups (again, hydrocarbon-substituted benzene being preferred wherein the total number of carbon atoms in the substituent group or groups does not exceed ten. Preferably the hydrocarbon substituent group(s) is(are) alkyl, and still more preferably contain a total of not more than about six carbon atoms. The suitable alkyl groups may be of straight-chain or of branched-chain configuration.

The nature of the foregoing-described cations, as well as methods for their preparation, are set out in detail in such works as Coates, "Organo-Metallic Compounds," Methuen (1956), in the chapter (chapter VI) entitled "The Transition Elements," particularly that portion entitled "The Cyclopentadienyls," beginning at page 177, and in Rochow et al., "The Chemistry of Organometallic Compounds," Wiley (1957), in the chapter (chapter 10) entitled, "Compounds of the Transition Metals," and the references cited therein. In general the necessary cation is prepared by first forming the neutral metal compound, then oxidizing that compound to obtain the desired cation, using air, chlorine or silver salts as the usual oxidizing agents.

The clays which are suitable as starting materials for making our modified clay gelling and/or thickening agents are those exhibiting substantial base-exchange properties, and particularly those exhibiting comparatively high base-exchange properties and containing cations capable of more or less ready replacement. The clays particularly suitable include the montmorillonites viz., sodium, potassium, lithium and other bentonites, particularly of the Wyoming type; magnesium bentonite (sometimes called hectorite) and saponite; also montronite and attapulgite, particularly that of the Georgia-Florida type. These clays, characterized by an unbalanced crystal lattice, are believed to have negative charges which are normally neutralized by inorganic cations. As found in nature, therefore, they exist as salts of the weak clay-acid with bases such as the alkali- or alkaline-earth metal hydroxides. Bentonites which are particularly useful are the swelling bentonites of the Wyoming type and the swelling magnesium bentonites of the hectorite type.

The base-exchange capacities of the various clays enumerated run from about 25 to about 100 as milliequivalents of exchangeable base per 100 grams of clay. The montmorillonites have comparatively high base-exchange capacities, viz., 60–100. Attapulgite has substantial base-exchange capacity, viz., 25–35. Generally, the clays of higher base-exchange capacities are particularly useful where high exchange an organic base for the cation of the clay is desired.

As previously mentioned, untreated sodium montmorillonite in contact with water adsorbs larger quantities of water and swells, forming a gel. This swelling has been attributed to the lamellar structure of the clay mineral and to adsorption of water molecules upon the surfaces of the mineral sheets, thus giving rise to a separation of the sheets as the oriented clay layers build up to an appreciable depth. If the surfaces of the clay lamellae contain organic matter, as by the reaction of the base-exchange sites with organometallo cations as described herein, the ability of water molecules to be adsorbed is eliminated and the clay no longer exhibits its former swelling capacity in water. Thus, Wyoming bentonite, for example, which is essentially the sodium salt of montmorillonitic acid, is capable of reacting with organometallo cations described above. While the precise structure of the compounds so obtained is not fully understood at the present time, it is visualized as the salt of the cation with the clay, the salt physically consisting of clay mineral lamellae with the organometallo cations fairly regularly distributed over the surfaces and attached by salt formation between the cation and the clay anion, with the organic substituents of the organometallo cation extending out over the crystal surfaces. Such a material is now organophilic and as the size of the organic radicals increases the resulting clay salt gradually assumes the swelling characteristics in organic liquids which the untreated clay exhibited in water. For example, it will swell in many organic liquids and will form stable gels and colloidal dispersions. However, the ability to swell in organic liquids is not a criterion of all of the organometallo clay salts coming within the scope of the present invention. However, as described hereinafter, swelling properly is a preferred feature. All that is required is that the organometallo cation reacted with the clay is of such a character and is present to a sufficient extent to provide the clay salt with hydrophobic and organophilic properties.

The ratio of the organometallo cations to the clay may be varied within certain limits in converting the clay to the organophilic condition. In general, it is satisfactory to react the organometallo cation with the clay up to the ratio of about 75–100 milliequivalents of the cation radicals to 100 grams of the clay, which is approximately the base-exchange capacity of the standard highly swelling sodium bentonites or other montmorillonites, such as hectorite. However, it is not essential and in many cases is not desirable that all of the base-exchange capacity of the clay be satisfied by reaction with the organometallo cations. The proportion of cation replacement for the purpose of creating an organophilic and hydrophibic clay salt will depend upon the precise character of the clay and of the organometallo cation used, especially insofar as the size and configurations of the organo radicals directly attached to the metal are concerned and upon the alternate intended use for the product salt. Normally, the weight proporion of the organometallo cations reacting with the clay to produce an organophilic clay salt will be in the order of 5–25% based on the clay and preferably between about 7.5 and 15% by weight thereof. Dependent upon the molecular weight of the organometallo cation used, such weight proportions will normally react with from 50 to 100% of the cation exchange sites of a high base-exchange clay. If the molecular area of the organometallo cation is above about 50 square angstrom units, the clay salt formed therewith assumes not only a hydrophobic and organophilic character, but an additional beneficial characteristic permitting a so-called "direct transfer" to occur wherein the clay salt may be transferred directly from an aqueous medium into an immiscible oleophilic medium such as mineral oil. This will be referred to more fully hereinafter.

The type of clay mineral to be used may vary with the intended use. For optimum gelling properties it is best to use a bentonite which exhibits a good swelling property in water. However, non-swelling clays when converted to the organometallo salts described are satisfactory for many purposes as referred to below.

It is to be understood that the clay portion of the salts of this invention need not in all cases be pure, but may be mixed with other, preferably inert, materials, such as extenders, supports, surface and/or mass modifying materials, and the like.

In the preparation of salts of base-exchange clays, replacement of the replaceable inorganic ions by organometallo cations of this invention is readily effected by one of two methods: (1) The organometallo cations are preformed and added at any desirable temperature from room temperature to about 250° F. to an aqueous disperson of the clay; or (2) an A—M—B organometallo compound is adsorbed upon a clay surface and the organometallo compound is converted to an oxidized (cationic) form which in turn replaces replaceable inorganic cations of clay to form an organometallo salt of the clay. The former process is preferred since the medium is not subjected to the oxidizing action of the oxidizing agent.

In the preparation of organic gels various methods may be followed. If it is desired to prepare a gel free from abrasive impurities, it may be advantageous to start with a dilute aqueous dispersion of bentonite or other clay and allow the non-bentonite impurities (gangue) to settle out or to remove them by centrifuging. Thereafter the bentonite dispersion may be reacted with the oxidized salt form of the organo metallic compounds. If the proportion and character of the organometallo cations (generally, where the organic groups directly bonded to the carbocyclic rings in the cation contain a total less than about 12 carbon atoms each) are such that the resulting clay salt is one which does not separate readily from water in the presence of a water-immiscible solvent, it is then preferred to filter the resulting clay salt and dry it either by displacement of water with non-aqueous liquid and evaporation of the replacing liquid from the product or by passing the filtered product to a drying compartment, such as an oven.

However, when the proportion and character of the organometallo cations (generally, where the carbocyclic rings thereof are directly substituted by one or more organic groups containing a total of more than about 12 carbon atoms) are such that the clay salt will transfer from an aqueous dispersion into a non-aqueous water-immiscible solvent, it is then a preferred practice to accomplish this transfer without any intermediate drying step or, rather, without reducing the clay salt to a dry powder. For example, the reaction of hectorite with approximately 10% by weight of the octadecyl ferricinium cation results in a clay salt being formed in an aqueous suspension which will readily transfer into a mineral oil from the water without any intermediate formation of the dry powder. Consequently, it is a preferred practice in this instance to suspend the clay in water, add the oxidized salt form of the octadecyl ferrocene, modify the reaction mixture with mineral oil and agitate so as to permit thorough contact of the aqueous clay salt phase with the mineral oil phase. Upon such treatment, the clay salt transfers from the aqueous phase into the mineral oil and a large portion of the water may be removed such as by passing the mixture over a screen or by decanting the oily layer. The mixture may be dehydrated by heating to a point above the boiling point of the water, the temperature being selected base upon the pressure of the surrounding atmosphere or the reduced pressure. A preferred form of apparatus for this comprises an agitated thin film drier wherein the dewatered curd passes to the interior of a drum where it is spread over the interior surfaces thereof by means of rapidly rotating paddles. It passes through the drier in only a few seconds residence time, at the end of which all of the water is removed. Under these circumstances, greases exhibiting the highest "yield" are obtained.

The following examples illustrate the present invention.

EXAMPLE I

Ferricinium sulfate solution was prepared by oxidation of 4.46 parts by weight of ferrocene with silver sulfate, followed by subsequent removal of the silver and excess of ferrocene by filtration. The solution of ferricinium sulfate was added to 1,000 parts by weight of a 2% aqueous slurry of hectorite at room temperature with stirring. The flocculated organometallo clay salt thus produced was filtered and washed with water. The filter cake was added to a mixture of 200 parts by weight by a methyl phenyl silicone oil designated as Dow-Corning DC–500 Fluid, and 6,000 parts by weight of isopropyl alcohol. The alcohol and water were evaporated by allowing the mixture to stand in a steam cabinet at approximately 300° F. for about 12 hours. The resulting grease components were then homogenized on a paint mill during which 171 parts by weight of methyl phenyl silicone oil were added to produce a grease structure. The properties of the grease so produced are given in Table 1 following.

EXAMPLE II

A second organometallo clay salt was produced by use of the procedure of Example I except that the organometallo compound was n-butyl ferrocene. The properties of the grease so produced are given in Table 1 following.

EXAMPLE III

A grease was produced similarly but using di-n-propyl ferrocene, the properties of the grease being given in Table 1 following.

Table 1

| Grease | Composition, percent weight | Unworked pen | Worked pen | Water absorption, percent weight | Thin film test, 450° F. for 24 hr. | |
|---|---|---|---|---|---|---|
| | | | | | Loss, percent weight | Appearance |
| Ferrocene | 0.4 ferrocene, 5.1 hectorite, 94.5 DC-550. | 275 | 294 | 30 | 12 | Good. |
| n-Butyl-ferrocene | 0.6 n-butyl-ferrocene, 6.7 hectorite, 92.7 DC-550. | 285 | 313 | 35 | 10 | Do. |
| Di-n-propyl-ferrocene | 0.7 di-n-propyl-ferrocene, 6.2 hectorite, 93.1 DC-550. | 227 | 249 | 35 | 14 | Do. |

EXAMPLE IV

Ferrocene was alkylated with hexyl bromide and aluminum chloride and 28.2 parts by weight of the product were oxidized with chlorine to give a water-soluble green salt. This solution was used to form an organometallo clay salt with 300 parts by weight of a 2% slurry of hectorite. The organometallo clay salt was filtered and washed with water. It was then combined with 60 parts by weight of methyl phenyl silicone oil and the water was driven off by heating on a steam hot plate. The resulting grease was homogenized on a paint mill and had the following properties:

Unworked penetration _____ 131
Worked penetration _____ 140
Water absorption _____percent_ 45
Thin film evaporation, 24 hours at 450° F___do____ 35

EXAMPLE V

Dimesitylene chromium (I) ions were produced by the process of E. O. Fischer et al. (Zeit. für anorg. u. algemeine Chemie 286, 146) (1956). A solution, containing dimesitylene chromium (I), derived by oxidation of 46 parts by weight of the dimesitylene chromium was added to 500 parts by weight of 2% hectorite aqueous slurry. The organometallo clay salt so formed was filtered and washed with water. A grease was prepared from the organo clay by the method described in Example I; it had the following properties:

Unworked penetration _____ 230.
Worked penetration _____ 296.
Water absorption _____ 25%.
Thin film evaporation, 24 hours at 450° F__ 17.4% loss.

EXAMPLE VI

Bis-biphenyl chromium (I) iodide (1.95 parts by weight) was mixed with 250 parts by weight of a 2% hectorite clay slurry in a Waring Blendor at approximately room temperature. The organometallo clay salt so formed was then used as the gelling agent for methyl phenyl silicone oil, the process employed being that described in Example I.

EXAMPLE VII

The process of Example I was repeated, utilizing bentonite clay instead of hectorite, the organometallo compound being oxidized being di-n-propylferrocene. This grease had an unworked penetration of 200, a worked penetration of 213, water absorption of 65%, and a thin film evaporation test (24 hours at 450° F.) of 19.8%.

EXAMPLE VIII

Octadecyl ferrocene was oxidized with chlorine gas to produce the corresponding octadecyl ferricinium ion. This was reacted with hectorite clay as described in Example IV in the presence of water. Upon addition of methyl phenyl silicone oil and agitating, the organometallo clay salt associated with the oil and the major proportion of separated water was removed by decantation. Dehydration was completed by removing residual water by distillation, after which the organometallo clay salt and oil were homogenized to form a grease.

EXAMPLE IX

A grease composition can be prepared, utilizing 8% by weight of octadecyl ferricinium clay salt, milled into a bright stock mineral lubricating oil. Such greases exhibit excellent stability even when exposed to ionizing radiation.

These salts of clays with the organometallo cations of the transition metals of this invention are useful for the thickening or gelling of non-aqueous liquids, such as lubricants, printing inks, paints, waxes, asphalt, coal tars, resins, and oil base drilling muds as well as for allied uses. They are especially outstanding for these purposes due to their unexpectedly high thermal stability so that they may be used in oil base drilling muds, in the thickening or gelling of air filter lubricants, hot melt printing inks, hot spray paints, high temperature greases. They may be used in conjunction with asphalt combined with a resin, such as polyepoxide-polymerized fatty acid resins for the production of jet resistant overlays and the like. They may be added to solid fuel rocket propellants to alter consistency of the solid fuel components for the purpose of improving the crack resistance and fluidity characteristics of the components at the burning surface thereof during ignition of the rocket. In addition, many are useful as catalysts, particularly for reactions which are catalyzed by transition metals.

The clay salts may be utilized in mineral oil or synthetic lubricants for the production of greases which are not only outstanding in their high-temperature characteristics but also are highly effective at ordinary temperatures as well. The clay salts may be combined for this purpose, if desired, with other thickening or gelling agents, such as clays, onium clays, clays waterproofed with adsorbed amines, indigo dyes, indanthrene dyes, aryl ureas, soaps, silica gel, sulfonates and the like.

The lubricating oils include any of the well known hydrophobic lubricants, such as mineral oils, synthetic esters, such as bis(2-ethylhexyl)sebacate, silicones, such as dimethyl silicone or methyl phenyl silicone, pentaerythritol esters, such as $C_{10}$–$C_{14}$ tetraalkyl pentaerythritol esters, phosphates, such as trioctyl phosphate, silicates, such as tetraoctyl silicate, polyphenyl ethers, such as bis(m-phenoxyphenyl)ether and combinations of the same. Minor amounts of the salt may be utilized in lubricating oils for the purpose of thickening the latter without actually reaching a grease structure if so desired. At the same time the presence of the clay salt modifies the viscosity-temperature characteristics of the oil. Clay salts provided by this invention may be combined with asphalt and employed as a high temperature binder in the pelletizing of ores, such as iron ores; as thickeners for textile lubricants and as thickeners for the non-aqueous phase of emulsions, such as emulsions of lubricating oil with water or of fatty oils with water and the like. The compounds may be formed in situ beneath the surface of the earth, such as in the treatment of oil or gas wells wherein clay formation tends to collapse and block the well opening. In this particular use they are promising due to their thermal stability as compared with onium clays and the like formed in situ which are relatively thermally unstable. The compounds are useful in the thickening of paint and varnish removers, thus permitting the remover to remain for a satisfactory modifying length of time upon the surface coated with paint varnish or lacquer which is to be removed thereby.

We claim as our invention:

1. A clay originally exhibiting a base-exchange capacity of at least 25 in which exchangeable inorganic cations have been exchanged by cations containing the structural moiety represented by the formula $$(A\text{---}M\text{---}B)^{+b}$$

wherein M represents a metal other than manganese and selected from groups IVB, VB, VIB, VIIB and VIII of the periodic chart of the elements, A and B each independently is a hydrocarbon nucleus of the group consisting of aromatic nuclei and cyclomatic nuclei, directly bonded from at least one carbon atom thereof to the metal, M, and $b$ is a positive charge varying from 1 to 3.

2. A modified clay according to claim 1 wherein the original clay was a montmorillonite clay.

3. A modified clay according to claim 1 wherein the original clay was a hectorite clay.

4. A clay originally exhibiting a base-exchange capacity of at least 25 in which exchangeable inorganic cations have been exchanged by cations containing the structural moiety represented by the formula $$(A\text{---}M\text{---}A)^{+b}$$

wherein M represents a metal other than manganese and selected from groups IVB, VB, VIB, VIIB and VIII of the periodic chart of the elements, A is a hydrocarbon nucleus of the group consisting of aromatic nuclei and cyclomatic nuclei, directly bonded from at least one carbon atom thereof to the metal, M, and $b$ is a positive charge varying from 1 to 3.

5. A clay originally exhibiting a base-exchange capacity of at least 25 in which exchangeable inorganic cations have been exchanged by cations containing the structural moiety represented by the formula $$(A\text{---}M\text{---}A)^{+b}$$

wherein M represents a metal other than manganese and selected from groups IVB, VB, VIB, VIIB and VIII of the periodic chart of the elements, A is a hydrocarbon cyclomatic nucleus directly bonded from at least one carbon atom thereof to the metal, M, and $b$ is a positive charge varying from 1 to 3.

6. A clay originally exhibiting a base-exchange capacity of at least 25 in which exchangeable inorganic cations have been exchanged by cations containing the structural moiety represented by the formula $$(A\text{---}M\text{---}A)^{+b}$$

wherein M represents a metal other than manganese and selected from groups IVB, VB, VIIB and VIII of the periodic chart of the elements, A is a hydrocarbon aromatic nucleus directly bonded from at least one carbon atom thereof to the metal, M, and $b$ is a positive charge varying from 1 to 3.

7. A clay originally exhibiting a base-exchange capacity of at least 25 in which exchangeable inorganic cations have been exchanged by cations containing the structural moiety represented by the formula $$(A\text{---}Fe\text{---}A)^{+1}$$

wherein A represents a cyclomatic nucleus directly bonded from at least one carbon atom thereof to the metal, Fe.

8. A salt according to claim 7 wherein the cyclomatic nucleus is the cyclopentadienyl group.

9. A salt according to claim 7 wherein the cyclomatic nucleus is an alkyl-substituted cyclopentadienyl group.

10. A clay originally exhibiting a base-exchange capacity of at least 25 in which exchangeable inorganic cations have been exchanged by cations containing the structural moiety represented by the formula $$(A\text{---}Cr\text{---}A)^{+1}$$

wherein A represents an aromatic nucleus directly bonded from a carbon atom thereof to the metal, Cr.

11. A salt according to claim 10 wherein the aromatic nucleus is the mesitylene nucleus.

12. A salt according to claim 10 wherein the aromatic nucleus is the biphenyl nucleus.

References Cited in the file of this patent

UNITED STATES PATENTS

| | | |
|---|---|---|
| 2,763,613 | Scott | Sept. 18, 1956 |
| 2,821,512 | Haven | Jan. 28, 1958 |
| 2,947,769 | Pruett | Aug. 2, 1960 |

OTHER REFERENCES

Wilkinson, G.: J.A.C.S., vol. 74, pp. 6146–9 (1952).
Woodward et al.: J.A.C.S., vol. 74, pp. 3458–9 (1952).
J. Am. Chem. Soc. 74, page 2125 (April 30, 1952).
Cotton et al.: J.A.C.S., vol. 75, pp. 3586–7 (1953).
Rose: Condensed Chemical Dictionary, 6th ed., 1961, page 1190.
Hallam et al.: J. Am. Chem. Soc., 1956, pages 3030, 3035, 3036.